Oct. 31, 1967     R. D. HOUK     3,349,638
SELECTIVE VERNIER CONTROL
Filed Aug. 31, 1965     3 Sheets-Sheet 1

INVENTOR.
RICHARD D. HOUK
BY Hamilton & Cook
ATTORNEYS

Oct. 31, 1967    R. D. HOUK    3,349,638
SELECTIVE VERNIER CONTROL
Filed Aug. 31, 1965    3 Sheets-Sheet 3

INVENTOR.
RICHARD D. HOUK
BY Hamilton & Cook
ATTORNEYS

United States Patent Office 3,349,638
Patented Oct. 31, 1967

3,349,638
SELECTIVE VERNIER CONTROL
Richard D. Houk, Stow, Ohio, assignor to Morse Controls Inc., a corporation of Ohio
Filed Aug. 31, 1965, Ser. No. 483,970
10 Claims. (Cl. 74—503)

ABSTRACT OF THE DISCLOSURE

A control device for actuating the core of a push-pull control cable in gross amounts, or selectively, with accurately fine increments. The control device has a hub which is attached to the casing of the push-pull cable and a control shaft is attached to the core of the push-pull cable. The control shaft, although exteriorly threaded, is slidably received within the hub and a sleeve which is integral with and extends axially outwardly of the hub. A thread meshing ball is radially movable in a bore through the sleeve, and a collar carried on the sleeve is movable between a first and second position. A wall on the interior of the collar maintains the thread meshing means in mating engagement with the threads on the control shaft when the collar is in the first position for fine control. The wall is released from the thread meshing means when said collar is in the second position to permit the control shaft to slide axially through the hub and sleeve for gross control. The wall is preferably tangential to the sleeve and is inclined away therefrom at between 7° to 12° with respect to a reference line tangent to the sleeve at the mid point of the bore when the collar is in the first position.

The present invention relates generally to push-pull control cables. More particularly, the present invention relates to a control device for actuating the core of a push-pull control cable with respect to the casing thereof. Specifically, the present invention relates to a control device for moving the core of a push-pull control cable with respect to the casing thereof in gross amounts, and, selectively, with accurately fine, or vernier, increments.

Push-pull control cables are generally well known to the art as devices capable of transmitting mechanical motion in either direction when at least the ends of the cable casing are satisfactorily clamped in position. Push-pull cables, being flexible, are particularly suitable for installations where the cable is required to extend through a number of bends between a control station and a remote controlled station. Such cables are constructed to have a core slidably received in a supporting casing and are commonly utilized in conjunction with such devices as throttle controls. For such installations it is important that the control be capable of providing not only quick major adjustments in gross but also fine, accurate vernier adjustments.

Heretofore, several known control devices have been employed to provide such a result. The most widely known construction is quite complex in that it requires that the tubular support attached to the cable casing slidably receive a tubular adjusting member attached to the cable core and in which is also slidably received a release rod for positioning a ball-like engaging member into and out of mating engagement with the threaded interior of the tubular support member. The primary control knob is secured to the adjusting member and coaxially receives a secondary control knob secured to the release rod. To make a vernier adjustment the operator need only turn the primary control knob in the appropriate direction. However, for gross adjustment the operator is required to actuate the secondary control knob axially with respect to the primary knob and, while maintaining the secondary control knob actuated against the biasing action of a spring means, move the primary control knob axially in the desired direction.

Under even the most favorable conditions considerable manual dexterity is required to operate such a control. In moments of stress the results can be disastrous.

In order to alleviate the hazards imposed by the requirement of the aforementioned dexterous manipulation another known complex construction eliminates the secondary control knob and in its place employs a control knob nonrotatably and axially slidably mounted on the tubular adjusting member which interacts with the release rod by a plurality of spring biased, pivotal dogs carried on the tubular adjusting member and engageable between the knob and the release rod. For gross control the operator must always apply sufficient pressure to overcome the spring bias and thereafter move the control knob in the desired direction. Accordingly, approximation of incremental adjustments in gross are most difficult, and sometimes impossible, to obtain.

In both constructions the expense of threading the interior of the tubular support member is entailed.

It is therefore an object of the present invention to provide, for the core of a push-pull control cable, a control device capable of selective gross or fine adjustments the facile operation of which is totally independent of the personal stress to which the operator is exposed.

It is another object of the present invention to provide a control device, as above, which employs a single control knob, eliminates the necessity for the release rod interiorly of a tubular adjusting member and does not require that the interior of the tubular support member be threaded.

It is yet another object of the present invention to provide a control device, as above, which may be converted from fine to gross adjustment either by actuating a selector lever or merely by application of an axial force to the control knob.

It is a further object of the present invention to provide a control device, as above, in which the mechanism incident to effecting fine, or vernier, control can be totally disconnected to permit unobstructed relative axial movement between the adjusting member, or control shaft, and the tubular support in which it is received for gross control.

It is still another object of the present invention to provide a control device, as above, wherein the mechanism incident to effecting vernier control not only permits instantaneous conversion from vernier to gross control but also prevents inadvertent adjustments caused by vibration.

It is an even further object of the present invention to provide a control device, as above, which is relatively uncomplex and economical to manufacture and maintain.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

Figure 1:
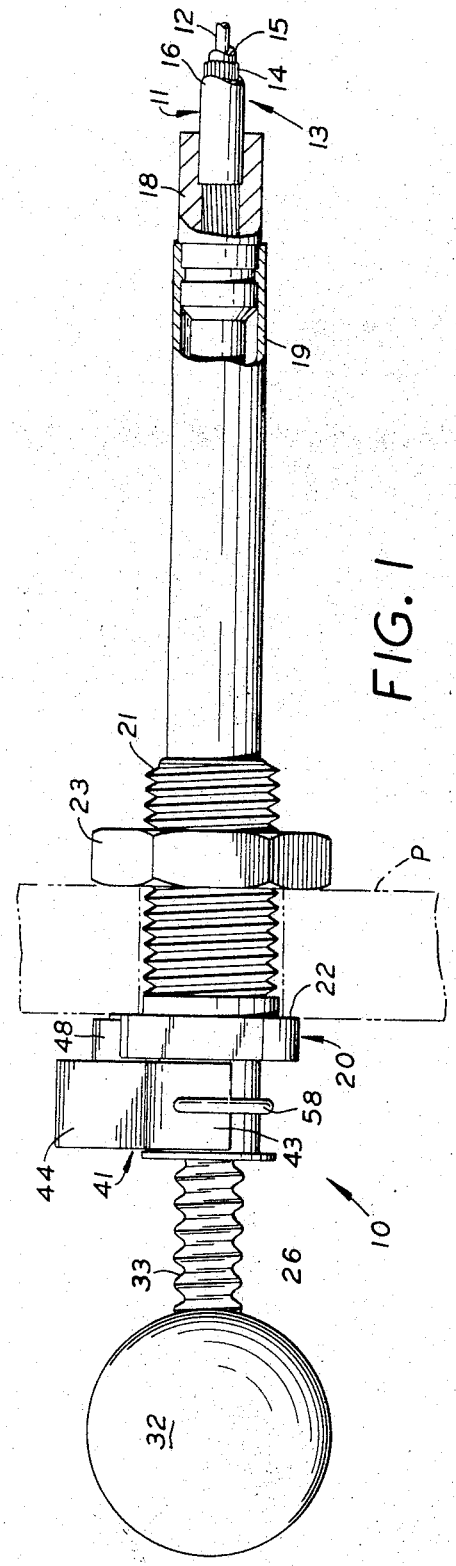
FIG. 1 is a side elevation, partly broken away and partly in section, depicting a push-pull control cable operatively connected to a control device embodying the concept of the present invention.

In general, a control device according to the concept of the present invention has a mounting hub adapted to be connected to the casing of a push-pull control cable. Slidable axially within the hub is a control shaft which is adapted to be connected to the core of the push-pull control cable. The outer surface of the control shaft is threaded for selective meshing engagement with a ball slidably received in a sleeve attached to the hub. A collar is movably carried on the sleeve and cooperates with the ball to move it into engagement with the threads on the control shaft or selectively permit it to withdraw therefrom.

Meshing engagement of the ball with the threaded control shaft permits vernier control, and disengagement of the ball allows gross control. Movement of the collar to disengage the ball from the threaded control shaft can be effected either by the operator moving the collar sequentially prior and independently of the control shaft or by applying a sharp axial force directly to the control shaft.

Referring more particularly to the drawings, the subject control device is indicated generally by the numeral 10 and is depicted as being operatively attached to a push-pull control cable assembly 11. A push-pull cable assembly 11 includes the core 12 and the casing 13 in which the core is reciprocably slidable.

The prior art knows many casing constructions, one of which is depicted environmentally herein and comprises a plurality of wires 14 contiguously laid in the form of a helical coil about the radially outer surface of an inner, flexible tube 15 which extends the full length of the casing 13. An outer flexible cover 16 encases the coil of wires 14 and extends along the entire casing to within a short distance from the end of the wires 14.

A fitting 18 is positioned over the end of the wires 14 and cover 16 and is securely attached thereto, as by swaging. Connected to and extending axially outwardly of the fitting 18 is a cylindrical guide tube 19. Fixed to the outer end of the guide tube 19 is a mounting hub 20. The mounting hub 20 has a threaded shank portion 21 terminating in a shoulder 22 by which the device may be mounted. For example, the shank portion 21 could extend through a suitable opening on an instrument panel P with the shoulder 22 abutting the face thereof. The nut 23 would then be tightened against the rear face of the panel to secure the control device 10 in position.

A sleeve 24 is formed on and extends axially outwardly of the hub 20. The sleeve 24 and shank portion 21 of the tube 19, and the hub 20 are bored concentrically of the tube 19, as at 25, slidably to receive a control shaft 26, one end of which is attached to the core 12.

Figure 2:
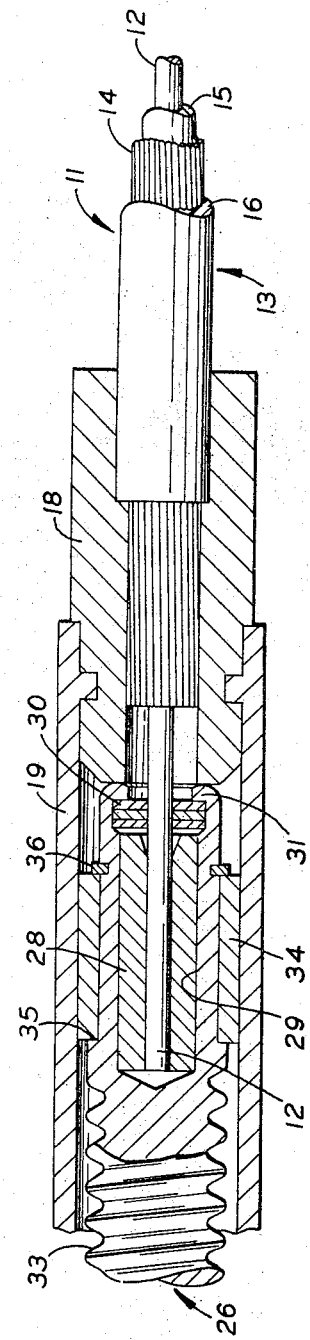
FIG. 2 is an enlarged cross sectional area of FIG. 1 depicting the connection of the control device to the core and casing of the push-pull control cable.

Inasmuch as the control shaft 26 rotates relative to the guide tube 19 during vernier adjustment, as will be more fully hereinafter described, and the cable core 12 is often attached at the remote controlled station in such a way that rotation thereof would be undesirable, it is preferable that the control shaft 26 be rotatably attached to the core 12. An exemplary construction is depicted in FIG. 2. The end of the cable core 12 is swaged or otherwise permanently received in a cylindrical plug 28, and the plug 28 is in turn rotatably received in a bore 29 in the end of the control shaft 26. One or more retaining washers 30 maintain the plug 28 against axial withdrawal from shaft 26 and are themselves retained within the shaft 26 by crimping the end thereof, as at 31.

The other end of the control shaft 26 mounts a control knob 32 exteriorly of the hub 20. The full length of the exterior of the control shaft 26 is threaded. Although no particular thread form is critical, the Whitworth style thread 33 is extremely suitable to the later described thread meshing means.

In order to reduce friction, the interior of the guide tube 19 is of a diameter slightly greater than the diameter of the bore 25 through hub 20. The innermost end of the guide shaft 26 is of reduced diameter and supports an annular bearing 34 slidably received within the tube 19 and affixed to the shaft 26 between a retaining shoulder 35 and a spring ring clip 36. The control shaft 26 is thus supported in the control device 10 by the bearing 34 and the bored interior 25 of the hub 20.

Figure 3:
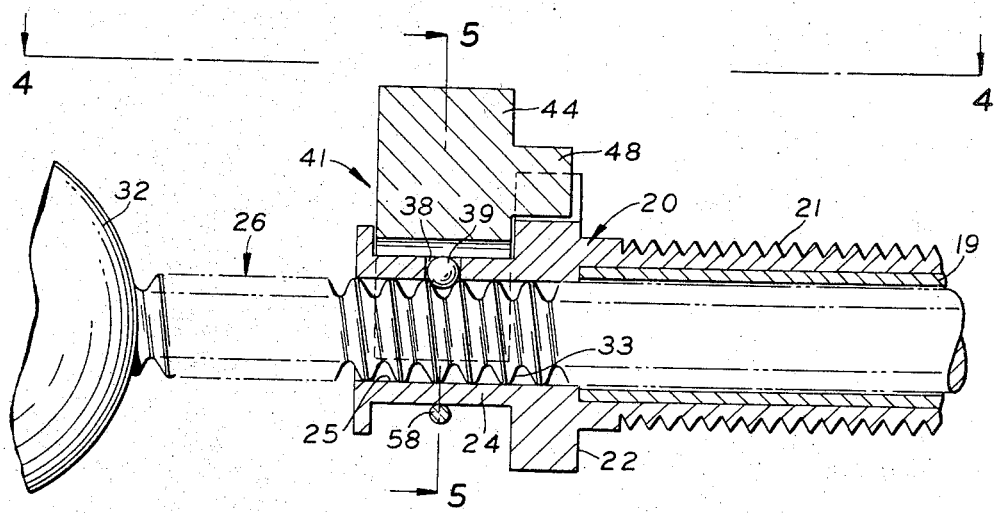
FIG. 3 is an enlarged cross sectional area of FIG. 1 depicting the mechanism by which selective vernier and gross adjustment is effected.
Figure 4:
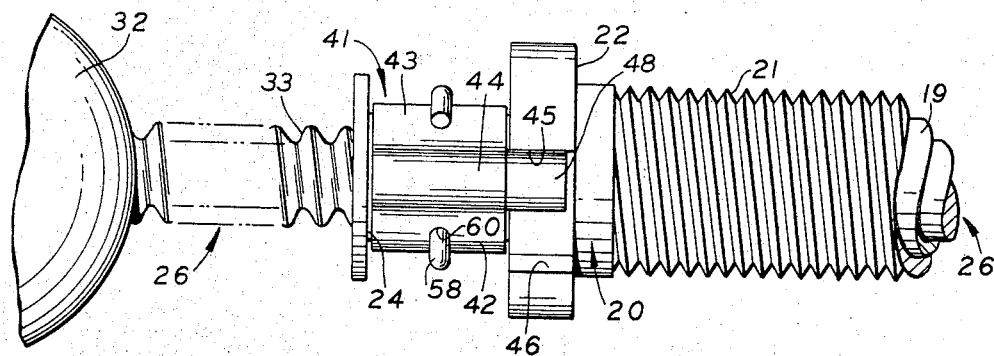
FIG. 4 is a top plan taken substantially on line 4—4 of FIG. 3.
Figure 5:
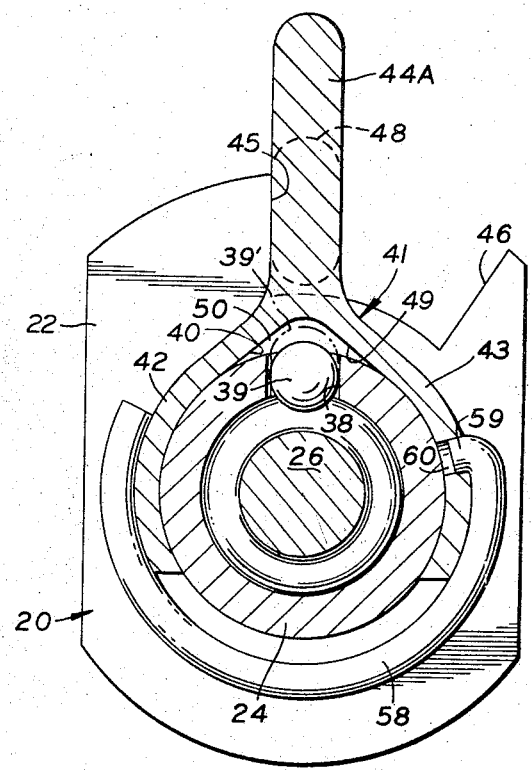
FIG. 5 is an enlarged cross section taken substantially on line 5—5 of FIG. 3 with the mechanism positioned to provide gross control; and, FIG. 6 is a view similar to FIG. 5 with the mechanism positioned to provide vernier control.
Figure 6:
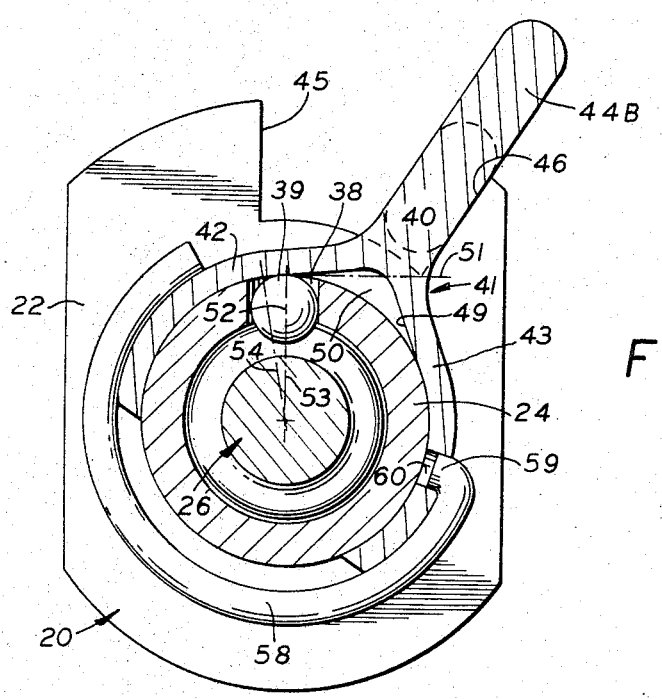

As can best be seen in FIGS. 3, 5 and 6, the sleeve 24 has a radially oriented bore 38 extending therethrough in which is slidably received a thread meshing ball 39. The ball 39 has a diameter greater than the wall thickness of the sleeve 24 so that it can be maintained in meshing engagement with the threaded control shaft 26 by contact with a wall means radially exteriorly of the sleeve 24.

As shown, the wall means is the wall 40 on the interior of collar 41 which is movably mounted on the sleeve 24. In the preferred embodiment the collar 41 has opposed wings 42 and 43 embracing and rotatably received upon the annular exetrior of the sleeve 24. A selector lever 44 extends radially outwardly of the collar 41 and is adapted for manually rotating the collar 41 on the sleeve 24. Stops 45 and 46 are provided on the hub 20 to engage a tab 48 on the lever 44 for limiting the rotation of the collar 41 between the limits of the two lever positions 44A (FIG. 5) and 44B (FIG. 6), respectively.

The wall 40 on the interior of wing 42 extends tangentially outwardly of the sleeve 24 and, with a similar wall 49 on the interior of wing 43 forms a cavity 50 within the collar 24. The cavity 50 is so formed that when the selector lever is in the position 44A the ball 39 may move radially outwardly through bore 38 and enter the cavity 50, as shown in phantom 39' in FIG. 5, sufficiently so that the ball 39 permits the threads 30 on controll shaft 26 to move freely therepast—hence, the ball 39 is floatingly disengaged, or released.

When the selector lever is in the position 44B the cavity 50 is moved circumferentially away from the ball 39 and the wall 40 abuts the ball 39 to maintain it in meshing engagement with the threaded control shaft 26.

Referring particularly to FIG. 6 it will be observed that the wall 40 is inclined slightly away from the ball 39. As shown, the wall 40 is inclined at between 7° to 12° outwardly of a reference line 51 tangent to the sleeve 24 at the mid point of the bore 38. This inclination can also be expressed with reference to the ball 39. The reference diameter 52 of ball 39 is perpendicular to the control shaft 26—i.e., it forms an extension of the reference radius 53 thereof. When the selector lever is in position 44B the wall 40 is tangent to the sleeve 42 at a radius 54 thereof positioned between 7° to 12° from the reference ball diameter 52.

The particular angular inclination is critical in that it affords instant conversion from vernier to gross control. With the throw lever in position 44A the operator can grasp the knob 32 and freely move the control shaft axially in either direction to effect the desired movement of the cable core 12. This is called gross control. However, with the lever in the position 44B, the ball 39 is maintained in engagement with the threads 33 on the control shaft 26 and the axial movement of the shaft 26 is effected solely by rotation of the knob 32—one rotation in either direction moving the shaft 26 an axial distance equal to the pitch of the threads 33. This is called vernier control and allows fine adjustments. Moreover, the engagement of the ball 39 with the threads 33 holds the control shaft 26 against unwanted axial movement due to vibration.

If, while the throw lever is in the position 44B an emergency arises and the operator must change from vernier to gross control he can do so with the subject control 10 without the necessity of manually moving the selector lever from position 44B to 44A. The operator simply applies a sharp force to the knob 32 in the direction he desires the control shaft 26 to move and the conversion from vernier to gross control is instantly effected. The application of the sharp force against the knob 32 is transmitted, by the threads 33, against the ball 39. Inasmuch as the ball 39 has a curved surface, the force applied to the ball 39 by the threads 33 can be considered as being resolved into an axial and a radial component. The axial component is resisted by the side wall of the bore 38. The radial component is opposed by the wall 40 on collar wing 42.

It has been found that a angular inclinations of less than 7° the collar 41 tends to remain with the lever in position 44B upon the application of a sharp blow to knob 32. Therefore, with the wall 40 inclined at an angle greater than 7° the collar can be rotated to convert from vernier gross control merely upon the application of a sharp blow to the knob 32. However, conversely it has been found that at angles of greater than 12° vibration and even the vernier operation of the knob 32 tends to cause the collar 41 to rotate. Such rotation is undesirable since one of the objects of such a control device is to lock the control shaft in the desired axial position. Therefore, for the optimum results the wall 40 should be inclined at approximately 7–12°.

If a particular type installation requires the conversion from vernier to gross control to be augmented, it may be desirable for at least the wing 42 to be made springingly resilient so that the wing 42 will slightly arch in proximity to the point at which the wall 40 is contacted by the ball 39 and assist the cooperative engagement therebetween by adding a springing impetus to the rotation of the collar 41 so as to free ball 39. This same resiliency facilitates assembly of the device 10 by permitting the wings 42 and 43 to extend only partially around the sleeve 24 and thus allowing the collar to be snapped onto the sleeve between the retaining flanges 55 and 56. A resilient C-shaped spring clip 58 is oriented in opposition to the two wings 42 and 43 and engages their outer surface to bias them radially inwardly.

With one end 59 of the clip 58 turned radially inwardly and received in a notch 60 in wing 43 the clip will rotate with collar 41 without interference and accidental disengagement of the clip 58 from wings 42 and 43 is prevented. As such, the clip 58 also assures that the collar 41 will not be inadvertently displaced from the sleeve 24 during the instantaneous conversion from vernier to gross control and also that the control will not be inadvertently converted from vernier to gross adjustment by vibration.

It should therefore be apparent that a control device according to the concept of the present invention permits selective gross or vernier adjustment as well as instantaneous conversion from vernier to gross adjustment and otherwise accomplishes the objects of the invention.

What is claimed is:

1. A vernier control device for the core of a push-pull control cable comprising, a mounting hub, a control shaft slidably received through said hub, thread means on the exterior of said control shaft, a collar carried on said hub and movable thereon between a first and second position a thread meshing means carried on said hub, said collar maintaining said thread meshing means in mating engagement with the threads on said control shaft when said collar is in said first position, and said collar released from said thread meshing means when said collar is in said second position to permit said control shaft to slide axially of said hub.

2. A vernier control device for the core of a push-pull control cable comprising, a mounting hub, a control shaft slidably received through said hub, thread means on the exterior of said control shaft, a sleeve attached to said hub and extending around at least a portion of said control shaft, a bore generally radially through said sleeve, a thread meshing means movable radially in said bore, a collar carried on said sleeve and movable between a first and second position, said collar maintaining said thread meshing means in mating engagement with the threads on said control shaft when said collar is in said first position, and said collar released from said thread meshing means when said collar is in said second position to permit said control shaft to slide axially of said hub.

3. A vernier control device for the core of a push-pull control cable comprising, a mounting hub, a control shaft slidably received through said hub, thread means on the exterior of said control shaft, a sleeve attached to said hub and extending around at least a portion of said control shaft, a bore generally radially through said sleeve, a thread meshing ball movable radially in said bore, a collar carried on said sleeve and rotatable between a first and second position, a wall on the radially inner portion of said collar extending substantially tangentially outwardly of said sleeve to form a cavity therebetween, said wall abutting said ball when said collar is in the first position to maintain said ball in mating engagement with the threads on said control shaft, said wall rotated away from said ball when said collar is in the second position.

4. A control device, as set forth in claim 3, in which the tangential wall on the radially inner portion of said collar is inclined at between 7° to 12° away from a reference line tangent to said sleeve at the mid point of said bore when said collar is in said first position.

5. A vernier control for a push-pull cable having a casing and a core slidably received therein comprising, a hub attached to said casing, a control shaft slidably received through said hub, a first end of said control shaft attached to the cable core on one side of said hub, a second end of said control shaft having a knob on the opposite side of said hub, the radially outer surface of said control shaft being threaded, a sleeve extending from said hub circumferentially of said drive shaft, a radial bore through said sleeve, a thread meshing means slidably received in said bore, a collar carried on said sleeve, means for rotating said collar between a first and second position on said sleeve, a wall on the radially inner portion of said collar extending substantially tangentially outwardly of said sleeve to form a cavity therebetween, said wall abutting said thread meshing means when said collar is in the first position to maintain said thread meshing means in mating engagement with the threads on said control shaft, said wall rotated away from said thread meshing means when said collar is in the second position.

6. A control device, as set forth in claim 5, in which the thread meshing means is a ball having a diameter greater than the thickness of the sleeve wall.

7. A control device, as set forth in claim 6, in which the collar has opposed wing segments and a resilient means is provided for biasing said collar wings radially inwardly.

8. A control device, as set forth in claim 7, in which the tangential wall on the radially inner portion of one of said collar wings is inclined at between 7° to 12° away from a reference line tangent to said sleeve at the mid point of said bore when said collar is in said first position.

9. A vernier control for a push-pull cable having a casing and a core slidably received therein comprising, a guide tube secured to the cable casing, a mounting hub attached to said guide tube, a threaded control shaft slidably received through said guide tube and hub, one end of said control shaft rotatably fastened to the cable core interiorly of said guide tube, the second end of said control shaft having a knob nonrotatably fastened thereto exteriorly of the hub and guide tube, a sleeve extending outwardly of said hub and around said control shaft, a bore communicating with the threads on said control shaft through said sleeve, a ball in said bore movable into and out of meshing engagement with said threads, a collar positioned radially of said sleeve, a wall on said collar opposing said sleeve, means for selectively moving said collar between a first and second position, said wall abutting said ball when said collar is in the first position to maintain said ball in mating engagement with the threads on said control shaft, said wall being displaced from said ball when said collar is in the second position to permit said ball to disengage from said threads.

10. A control device, as set forth in claim 9, in which the ball has a reference diameter perpendicular to the control shaft and the wall is tangent to said sleeve at a radius thereof positioned approximately 7° to 12° from said reference diameter.

References Cited
UNITED STATES PATENTS 2,871,719   2/1959   Hooker _____ 74—503

FRED C. MATTERN, JR., *Primary Examiner.*

W. S. RATLIFF, *Assistant Examiner.*